(No Model.) 2 Sheets—Sheet 1.

J. A. EICHNER, Jr.
CLOTHES LINE AND CLOTHES PIN BOX.

No. 419,427. Patented Jan. 14, 1890.

WITNESSES:
L. Douville,
P. F. Dagle.

INVENTOR:
John A. Eichner Jr.
BY
John A. Wiedersheim
ATTORNEY.

(No Model.) 2 Sheets—Sheet 2.

J. A. EICHNER, Jr.
CLOTHES LINE AND CLOTHES PIN BOX.

No. 419,427. Patented Jan. 14, 1890.

WITNESSES:
L. Douville,
P. F. Nagle.

INVENTOR:
John A. Eichner, Jr.
BY John A. Wiedersheim
ATTORNEY.

UNITED STATES PATENT OFFICE.

JOHN A. EICHNER, JR., OF PHILADELPHIA, PENNSYLVANIA.

CLOTHES-LINE AND CLOTHES-PIN BOX.

SPECIFICATION forming part of Letters Patent No. 419,427, dated January 14, 1890.

Application filed September 21, 1889. Serial No. 324,643. (No model.)

*To all whom it may concern:*

Be it known that I, JOHN A. EICHNER, Jr., a citizen of the United States, residing in the city and county of Philadelphia, State of Pennsylvania, have invented a new and useful Improvement in Clothes-Line and Clothes-Pin Boxes, which improvement is fully set forth in the following specification and accompanying drawings.

My invention relates to improvements in clothes-line and clothes-pin holders; and it consists in the combination and arrangement of parts as herein set forth and claimed.

Figure 1:
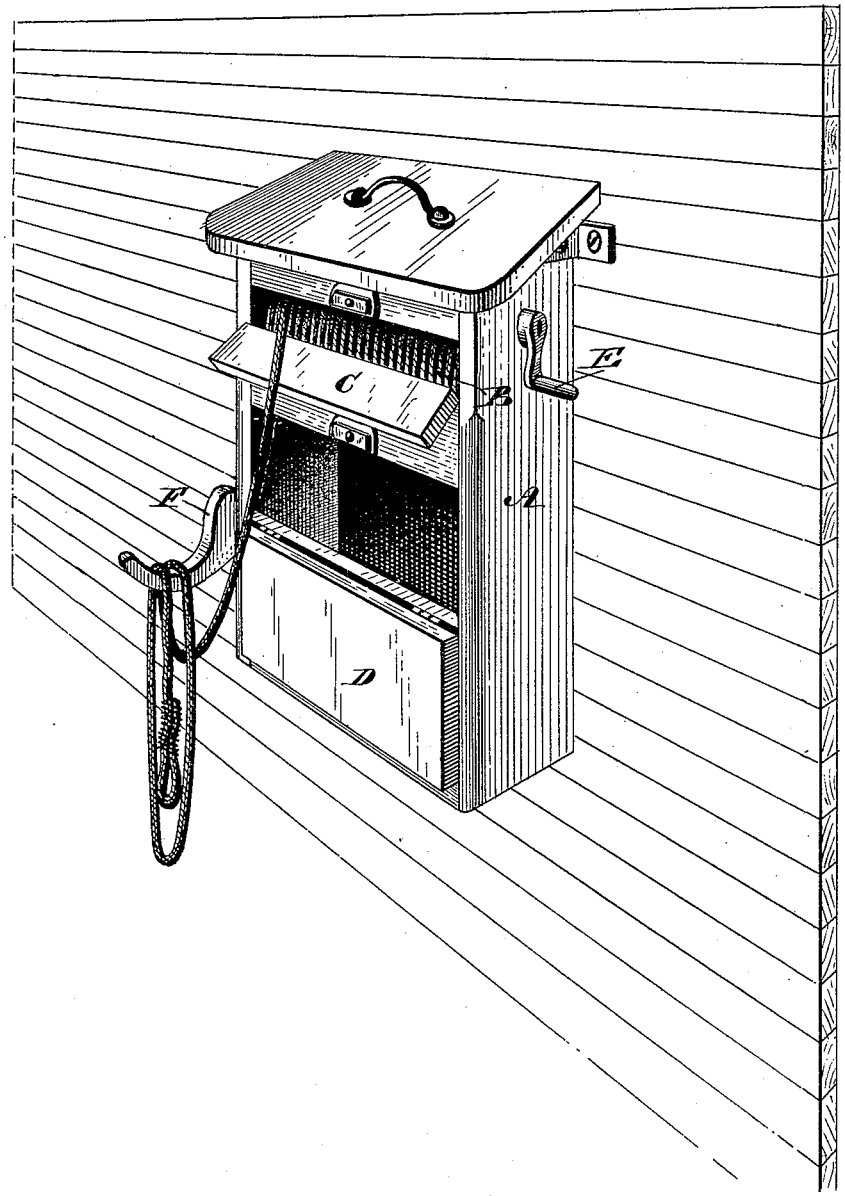
Figure 2:
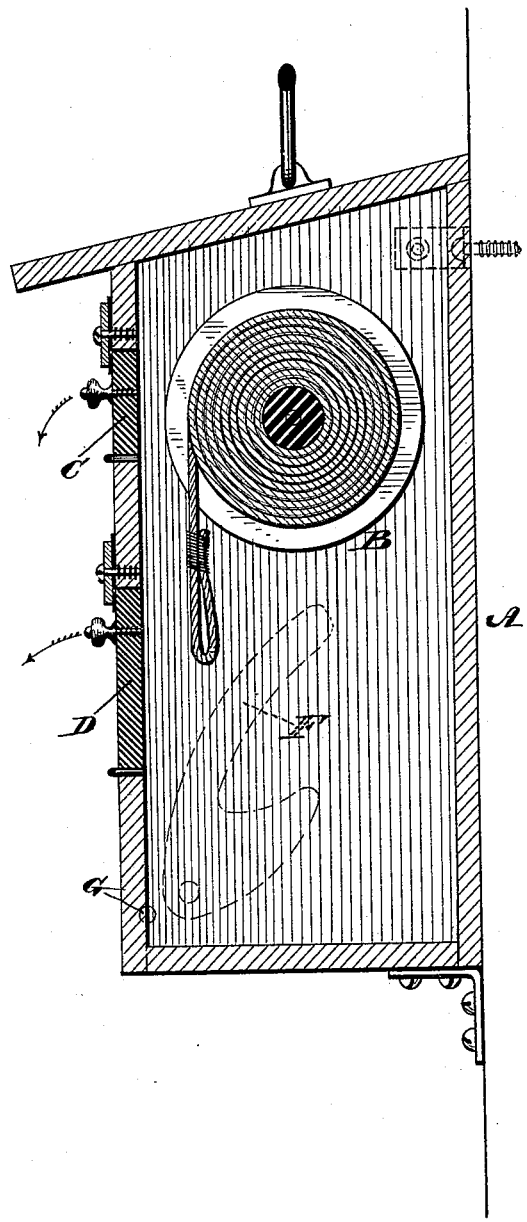

Figure 1 represents a perspective view of a clothes-line and clothes-pin box embodying my invention. Fig. 2 represents a vertical section thereof on an enlarged scale.

Similar letters of reference indicate corresponding parts in the two figures.

Referring to the drawings, A designates a box having a reel B mounted therein, and provided with two doors C and D, the door C being in front of the reel, and the door D below the same. One of the journals or end of the shaft of the reel is extended outside of the box, where it is provided with a crank-handle E, for operating purposes.

Pivoted to the side of the box is an arm F, preferably of hook shape, the same when in operative position, as in Fig. 1, being rested horizontally against a pin, stud, or other stop G, secured to the box, so as to sustain lengths of the line, especially after the same is taken in and has been gathered in loops preparatory to being wound upon the reel. When the arm is not required for use, it may be folded or placed in upright position, as illustrated by the dotted lines, Fig. 2.

It will be seen that when the door C is opened the reel is uncovered, and the clothes-line may be run off of the same as required. Again, the line may be wound on the reel and the door C then closed, thus guarding the interior of the box from rain, &c.

Clothes-pins may be placed in the bottom of the box, the door D affording access thereto, it being noticed that the reel is sufficiently elevated or occupies the upper part of the box, so as not to interfere with the clothes-pins. When the door D is closed, the box is comparatively weather-tight.

The roof of the box is slanting and overhangs the front of the same, so as to direct rain, &c., over said front.

The box may be secured to a fence or elsewhere by brackets or other suitable means.

Having thus described my invention, what I claim as new, and desire to secure by Letters Patent, is—

1. A box having a reel mounted in the upper part thereof and provided with a door opposite said reel, a hook-arm pivoted to the outer side of the box, and a stop or rest for said arm, said parts being combined substantially as and for the purpose set forth.

2. The box A, with slanting top and having the reel B journaled therein, and with handle E outside thereof, a pivoted hook-arm on the outside of the box, provided with a supporting-pin, and upper and lower doors in said box, the upper door being opposite the said reel, and attaching means, substantially as described, for securing said box in elevated position, said parts being combined substantially as described.

JOHN A. EICHNER, JR.

Witnesses:
JOHN A. WIEDERSHEIM,
A. P. JENNINGS.